(12) United States Patent
Hou et al.

(10) Patent No.: US 11,404,714 B2
(45) Date of Patent: Aug. 2, 2022

(54) CAPACITOR ASSISTED BIPOLAR BATTERY

(71) Applicant: GM GLOBAL TECHNOLOGY OPERATIONS LLC, Detroit, MI (US)

(72) Inventors: Mengyan Hou, Shanghai (CN); Haijing Liu, Shanghai (CN); Mark W. Verbrugge, Troy, MI (US); Qili Su, Shanghai (CN); Meiyuan Wu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 178 days.

(21) Appl. No.: 16/523,324

(22) Filed: Jul. 26, 2019

(65) Prior Publication Data

US 2021/0028481 A1 Jan. 28, 2021

(51) Int. Cl.
*H01M 10/04* (2006.01)
*H01M 10/0525* (2010.01)
(Continued)

(52) U.S. Cl.
CPC ........ *H01M 10/0418* (2013.01); *H01G 11/32* (2013.01); *H01G 11/46* (2013.01);
(Continued)

(58) Field of Classification Search
CPC ......... H01M 10/0418; H01M 10/0525; H01M 4/366; H01M 10/044; H01M 2004/029;
(Continued)

(56) References Cited

U.S. PATENT DOCUMENTS 10,418,668 B2 9/2019 Wu et al.
10,637,040 B2 4/2020 Zhang et al.
(Continued)

FOREIGN PATENT DOCUMENTS

| CN | 112310469 A | 2/2021 | |
|---|---|---|---|
| CN | 112397793 A | 2/2021 | |
| WO | WO2017206095 | * 12/2017 | ........ H01M 10/0525 |

OTHER PUBLICATIONS

Zuo et al. "Battery-Supercapacitor Hybrid Devices: Recent Progress and Future Prospects." Adv. Sci. 2017, 4, 1600539 (Year: 2017).*

(Continued)

*Primary Examiner* — Michael L Dignan
(74) *Attorney, Agent, or Firm* — Harness, Dickey & Pierce, P.L.C.

(57) ABSTRACT

A bipolar battery may comprise first, second, and third bipolar electrodes that are physically and electrically isolated from one another by intervening non-liquid electrolyte layers. Each of the bipolar electrodes may comprise a bipolar current collector including a first electroactive material layer connected to a first side thereof and a second electroactive material layer connected to a second side thereof. Each electroactive material layer may comprise at least one of: (i) a lithium ion battery positive electrode material, (ii) a lithium ion battery negative electrode material, and/or (iii) a capacitor electrode material. At least one of the electroactive material layers comprises a capacitor electrode material.

12 Claims, 4 Drawing Sheets

(51) Int. Cl.
*H01M 4/36* (2006.01)
*H01G 11/32* (2013.01)
*H01G 11/46* (2013.01)
*H01M 4/02* (2006.01)

(52) U.S. Cl.
CPC ......... *H01M 4/366* (2013.01); *H01M 10/044* (2013.01); *H01M 10/0525* (2013.01); *H01M 2004/029* (2013.01)

(58) Field of Classification Search
CPC ..... H01M 10/0413; H01M 2300/0065; H01M 4/583; H01M 50/46; H01M 10/0562; H01M 10/0565; H01M 4/131; H01G 11/32; H01G 11/46
See application file for complete search history.

(56) References Cited

U.S. PATENT DOCUMENTS

| | | | |
|---|---|---|---|
| 10,658,663 B2 | 5/2020 | Zhang et al. | |
| 10,756,385 B2 | 8/2020 | Deng | |
| 10,944,100 B2 | 3/2021 | Liu et al. | |
| 2013/0162216 A1* | 6/2013 | Zhamu | H01M 4/583 320/130 |
| 2014/0321030 A1* | 10/2014 | Tsurumi | H01G 9/15 361/525 |
| 2016/0027591 A1* | 1/2016 | Murakami | H01G 11/06 361/502 |
| 2016/0308195 A1* | 10/2016 | Mui | H01M 4/667 |
| 2018/0034037 A1* | 2/2018 | Zhang | H01M 4/0404 |
| 2018/0034094 A1* | 2/2018 | Liu | H01G 11/10 |
| 2018/0358656 A1 | 12/2018 | Deng | |
| 2019/0019629 A1* | 1/2019 | Makino | H01G 11/86 |
| 2019/0206632 A1* | 7/2019 | Zhamu | H01G 11/46 |
| 2019/0252728 A1 | 8/2019 | Shimizu et al. | |
| 2019/0305378 A1* | 10/2019 | Ogihara | H01M 4/587 |
| 2019/0363395 A1 | 11/2019 | Chen | |
| 2019/0372103 A1 | 12/2019 | Miki | |
| 2019/0372127 A1* | 12/2019 | Li | H01G 11/50 |
| 2019/0372156 A1* | 12/2019 | Sakamoto | H01M 4/134 |
| 2019/0372186 A1 | 12/2019 | Kong et al. | |
| 2020/0036070 A1 | 1/2020 | Li et al. | |
| 2020/0075960 A1 | 3/2020 | Wachsman et al. | |
| 2021/0050157 A1 | 2/2021 | Hou et al. | |

OTHER PUBLICATIONS

Tong et al. "Numerical investigation of water cooling fora lithium-ion bipolar battery pack." International Journal of Thermal Sciences 94 (2015) 259-269 (Year: 2015).*
Zheng et al. "A hybrid electrochemical device based on a synergistic inner combination of Li ion battery and Li ion capacitor for energy storage." Sci. rep. 7, 41910 (Year: 2017).*
Zhong et al. "Improved energy density of quasi-solid-state supercapacitors using sandwich-type redox-active gel polymer electrolytes." Electrochimica Acta 166 (2015) 150-156 (Year: 2015).*
Liu et al. "Preparation and chemical compatibility of lithium aluminum germanium phosphate solid electrolyte." Solid State Ionics 318 (2018) 27-34 (Year: 2018).*
Evanko et al. "Stackable bipolar pouch cells with corrosion-resistant current collectors enable high-power aqueous electrochemical energy storage." Energy Environ. Sci., 2018, 11, 2865 (Year: 2018).*
Chami et al. "Safe Li-Ion Technology for Micro and Mild Hybrid application based on CEA Bipolar LiFePO4/Li4Ti5O12 technology." World Electric Vehicle Journal, vol. 3, 0735-0739, 2009 (Year: 2009).*
Verbrugge et al., "Microstructural Analysis and Mathematical Modeling of Electrical Double-Layer Supercapacitors," Journal of The Electrochemical Society, vol. 152 (5) (2005) pp. D79-D87.
Verbrugge et al., "Activated-carbon electric-double-layer capacitors: electrochemical characterization and adaptive algorithm implementation," Journal of Power Sources, vol. 141 (2005) pp. 369-385.
Verbrugge et al.,"Analytic Solutions and Experimental Data for Cyclic Voltammetry and Constant-Power Operation of Capacitors Consistent with HEV Applications," Journal of The Electrochemical Society, vol. 153 (6) (2006) pp. A1237-A1245.
Li et al., U.S. Appl. No. 16/048,427 entitled "Capacitor-Assisted Solid-State Battery," filed Jul. 30, 2018.

* cited by examiner

CAPACITOR ASSISTED BIPOLAR BATTERY

INTRODUCTION

A battery is a device that converts chemical energy into electrical energy by means of electrochemical reduction-oxidation (redox) reactions. For example, lithium ion batteries store and release energy via the reversible electrochemical intercalation and deintercalation of lithium ions. In secondary or rechargeable batteries, these electrochemical reactions are reversible, which allows the batteries to undergo multiple charging and discharge cycles.

Secondary lithium batteries generally comprise one or more electrochemical cells that include a negative electrode, a positive electrode, an electrolyte sandwiched between the negative and positive electrodes, and a pair of current collectors respectively electrically coupled to the negative and positive electrodes. The intervening electrolyte electrically insulates the electrodes from each other while providing a medium for the conduction of lithium ions therebetween. The current collectors are electrically conductive and allow electrons to simultaneously travel from one electrode to another via an external circuit. In some instances, a porous separator infiltrated with a liquid or polymer electrolyte may be used to physically separate the electrodes from each other while permitting free ion flow therebetween.

In practice, multiple electrochemical cells may be stacked side-by-side within a battery. Lithium ion batteries are oftentimes constructed with a monopolar architecture, wherein a monopolar current collector supports on each of its opposite faces either a positive electrode or a negative electrode. For example, in a monopolar battery, a positive electrode is supported on a first side of a positive current collector a positive electrode is also supported on an opposite second side of the same positive current collector. Likewise, in a monopolar battery, a negative electrode is supported on a first side of a negative current collector a negative electrode is also supported on an opposite second side of the same negative current collector. Stacks of electrochemical cells are formed by positioning the positive and negative current collectors and their associated electrodes adjacent one another in an alternating arrangement with layers of porous separator material disposed therebetween. The positive and negative current collectors may be respectively connected in a serial or parallel arrangement to a pair of positive and negative battery terminals.

Batteries exhibiting a bipolar architecture may provide certain advantages over monopolar battery architectures, including increased electrical potential, energy density, and power density, more uniform current density, increased active material utilization and reduced electrical resistance. Bipolar batteries comprise multiple bipolar electrodes and two monopolar electrodes disposed at opposite ends of the bipolar battery. Each bipolar electrode comprises a bipolar current collector having a positive electrode supported on a first side thereof and a negative electrode supported on an opposite second side thereof. The bipolar electrodes are stacked adjacent one another with porous separator layers disposed therebetween such that the positive electrode of one bipolar electrode faces toward the negative electrode of the next adjacent bipolar electrode. A positive electrode is supported on one of the monopolar electrodes and a negative electrode is supported on the other monopolar electrode, with the electrode material supported on each monopolar electrode being selected to form an electrochemical cell with the electrode material supported on the opposing face of the adjacent bipolar electrode. In a bipolar battery, the bipolar current collectors electrically connect the cells of the battery to one another in a serially arrangement and by allowing electrons to flow between the positive and negative electrodes supported on opposite sides thereof. Lithium ions are transferred between the negative and positive electrodes of each electrochemical cell through the intervening separator layers.

Electrostatic double layer capacitors, sometimes referred to as supercapacitors, electrostatically store and release electrical energy by separation of charge at an interface between a surface of a charged electrode and an electrolyte. At the interface, a layer of charged ions forms in the surface lattice structure of the electrode and a layer of oppositely charged solvated ions is generated in the electrolyte, with a layer of polarized solvent molecules physically separating the oppositely charged layers of electrode ions and electrolyte ions. Pseudocapacitors, a subset of supercapacitors, store charge by the formation of an electrostatic double layer, and also by Faradaic electric charge transfer between adsorbed electrolyte ions and the electrode material.

In comparison to lithium ion battery positive and negative electrode materials, supercapacitors tend to exhibit relatively high power density (W/kg) and relatively long cycle life. In other words, the release of adsorbed lithium ions from supercapacitor materials tends to be faster than the de-intercalation of lithium ions from lithium ion battery positive and negative electrode materials. On the other hand, lithium ion battery positive and negative electrode materials tend to exhibit relatively high energy density (Wh/kg). This is because positive and negative electrode materials can usually intercalate a greater amount of lithium ions than can be adsorbed on the surfaces of a like amount of supercapacitor material. It would be desirable to produce an electrical storage device that exhibits a combination of both high energy density and high power density.

SUMMARY

A bipolar battery may comprise first, second, and third bipolar electrodes positioned adjacent one another and being physically and electrically isolated from one another by intervening non-liquid electrolyte layers. Each of the bipolar electrodes may comprise a bipolar current collector including a first electroactive material layer connected to a first side thereof and a second electroactive material layer connected to a second side thereof. Each electroactive material layer may comprise at least one of: (i) a lithium ion battery positive electrode material, (ii) a lithium ion battery negative electrode material, or (iii) a capacitor electrode material. In one form, at least one of the electroactive material layers comprises a capacitor electrode material.

In one form, the capacitor electrode material may comprise at least one electric double-layer capacitor material selected from the group consisting of activated carbon, carbon xerogel, carbon aerogel, carbon nanotube, mesoporous carbon, templated carbon, carbide-derived carbon, graphene, porous carbon spheres, or heteroatom-doped carbon.

In another form, the capacitor electrode material may comprise at least one pseudocapacitor material selected from the group consisting of a noble metal oxide, a noble metal hydroxide, a transition metal oxide, a transition metal hydroxide, or an electrically conductive polymer.

The non-liquid electrolyte layers each may comprise a solid, gel, or polymeric ionically conductive lithium-containing electrolyte material.

At least one of the first, second, or third bipolar electrodes may include a lithium ion battery positive electrode material layer coated on the first side thereof and a lithium ion battery negative electrode material layer coated on the second side thereof.

A bipolar battery may comprise first and second bipolar electrodes and one or more intermediate bipolar electrodes disposed between the first and second bipolar electrodes. The first and second bipolar electrodes each may comprise bipolar current collectors respectively coated on opposite first and second sides with a lithium ion battery negative electrode material layer and a lithium ion battery positive electrode material layer. The one or more intermediate bipolar electrodes each may comprise a bipolar current collector coated on opposite first and second sides with electroactive material layers. The bipolar electrodes may be physically separated and electrically isolated from one another by a plurality of intervening non-liquid electrolyte layers. Each electroactive material layer of the one or more intermediate bipolar electrodes may comprises at least one of: (i) a lithium ion battery positive electrode material, (ii) a lithium ion battery negative electrode material, or (iii) a capacitor electrode material. In one form, at least one of the electroactive material layers of the one or more intermediate bipolar electrodes comprises a capacitor electrode material.

The electroactive material layer coated on the first side of at least one of the intermediate bipolar electrodes may comprise a capacitor material and the electroactive material layer coated on the opposite second side thereof may comprise a lithium ion battery positive electrode material.

The electroactive material layer coated on the first side of at least one of the intermediate bipolar electrodes may comprise a lithium ion battery negative electrode material and the electroactive material layer coated on the opposite second side thereof may comprise a capacitor electrode material.

The electroactive material layers coated on the first and second sides of at least one of the intermediate bipolar electrodes each may comprise a capacitor electrode material.

The electroactive material layer coated on the first side of at least one of the intermediate bipolar electrodes may comprise a lithium ion battery negative electrode material and the electroactive material layer coated on the opposite second side thereof may comprise a layer of a capacitor electrode material overlying a layer of lithium ion battery positive electrode material.

The electroactive material layer coated on the first side of at least one of the intermediate bipolar electrodes may comprise a layer of a capacitor electrode material overlying a layer of a lithium ion battery negative electrode material and the electroactive material layer coated on the opposite second side thereof may comprise a lithium ion battery positive electrode material.

The electroactive material layer coated on the first side of at least one of the intermediate bipolar electrodes may comprise a layer of a capacitor electrode material overlying a layer of lithium ion battery negative electrode material and the electroactive material layer coated on the opposite second side thereof may comprise a layer of a capacitor electrode material overlying a layer of a lithium ion battery positive electrode material.

Each of the intermediate bipolar electrodes may comprise an upper end and an opposite lower end. In such case, the electroactive material layer coated on the first side of at least one of the intermediate bipolar electrodes may comprise a lithium ion battery negative electrode material and the electroactive material layer coated on the opposite second side thereof may comprise a capacitor electrode material coated on the upper end thereof and a lithium ion battery positive electrode material coated on the lower end thereof. In one form, the electroactive material layer coated on the first side of at least one of the intermediate bipolar electrodes may comprise a capacitor electrode material coated on the upper end thereof and a lithium ion battery negative electrode material coated on the lower end thereof and the electroactive material layer coated on the opposite second side thereof may comprise a lithium ion battery positive electrode material. The electroactive material layer coated on the first side of at least one of the intermediate bipolar electrodes may comprise a capacitor electrode material coated on the upper end thereof and a lithium ion battery negative electrode material coated on the lower end thereof and the electroactive material layer coated on the opposite second side thereof may comprise a capacitor electrode material coated on the upper end thereof and a lithium ion battery positive electrode material coated on the lower end thereof.

In one form, the bipolar battery may comprise a cooling medium disposed adjacent the lower ends of the intermediate bipolar electrodes.

The total number of first, second, and intermediate bipolar electrodes in the bipolar battery may be a whole number, n. In such case, the total number of non-liquid electrolyte layers in the bipolar battery may comprise n+1.

A first monopolar electrode may be disposed at a first end of the bipolar battery and a second monopolar electrode may be disposed at an opposite second end of the bipolar battery. In such case, the first monopolar electrode may comprise a first terminal current collector coated with a lithium ion battery negative electrode material layer. The second monopolar electrode may comprise a second terminal current collector coated with a lithium ion battery positive electrode material layer. The first, second, and intermediate bipolar electrodes may be disposed between and electrically isolated from the first and second monopolar electrodes.

The lithium ion battery negative electrode material layer of the first monopolar terminal electrode may be located opposed to and in electrochemically coupled relation to the lithium ion battery positive electrode material layer of the first bipolar electrode.

The lithium ion battery positive electrode material layer of the second monopolar terminal electrode may be located opposed to and in electrochemically coupled relation to the lithium ion battery negative electrode material layer of the second bipolar electrode.

DETAILED DESCRIPTION

The present disclosure is directed to a bipolar battery that includes as energy storage materials a combination of lithium ion battery electrode materials and capacitor electrode materials. The placement of the lithium ion battery electrode materials and the capacitor electrode materials in the bipolar battery may be tailored to produce an energy storage device that exhibits a desired combination of energy density (Wh/kg) and power density (W/kg).

Figure 1:
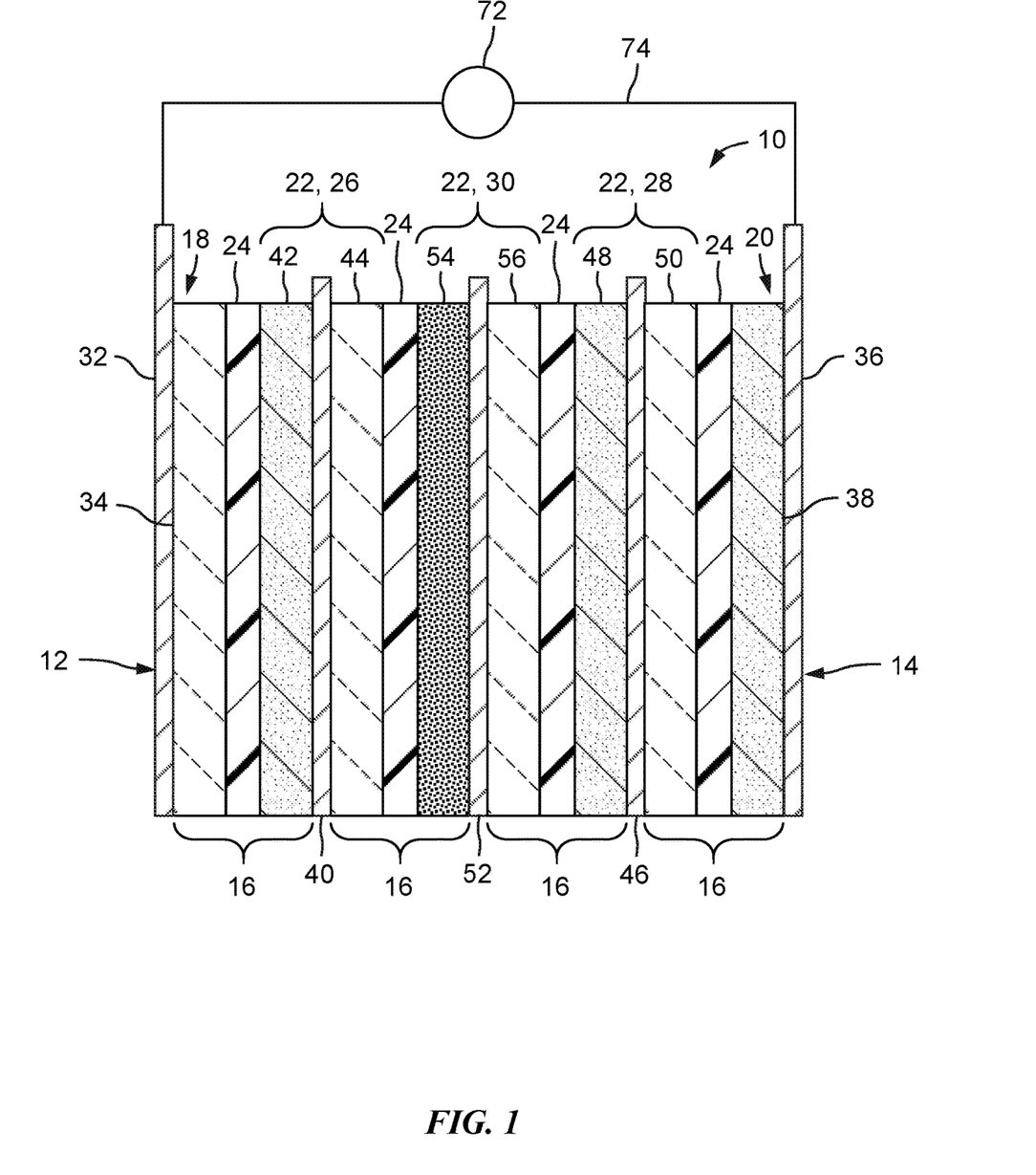
FIG. 1 is a schematic cross-sectional view of a bipolar battery comprising multiple bipolar electrodes disposed between a pair of monopolar electrodes, wherein each of the bipolar electrodes comprises a bipolar current collector including layers of electroactive material supported on opposite sides thereof, with one of the electroactive material layers including a capacitor electrode material.

FIG. 1 illustrates in idealized fashion a lithium ion bipolar battery 10 having a first end 12, an opposite second end 14, and multiple serially-arranged electrochemical cells 16 disposed in face-to-face relationship between the first and second ends 12, 14 thereof. The electrochemical cells 16 of the battery 10 are defined by a first monopolar electrode 18 disposed at the first end 12 of the battery 10, a second monopolar electrode 20 disposed at the second end 14 of the battery 10, one or more intermediate bipolar electrodes 22 disposed between the first and second monopolar electrodes 18, 20, and two or more intervening non-liquid electrolyte layers 24 disposed between adjacent electrodes 18, 20, 22. The non-liquid electrolyte layers 24 physically separate and electrically isolate the electrodes 18, 20, 22 from one another while permitting free ion flow therebetween. In one form, each of the non-liquid electrolyte layers 24 may have a thickness in the range of one micrometer to 200 micrometers. For example, each of the non-liquid electrolyte layers 24 may have a thickness in the range of 20 micrometers to 100 micrometers.

The number of non-liquid electrolyte layers 24 in the battery 10 depends on the number of bipolar electrodes 22. In particular, if the total number of bipolar electrodes 22 in the battery 10 is n, then the total number of non-liquid electrolyte layers 24 in the battery 10 will be n+1. The bipolar battery 10 of FIG. 1 includes a first bipolar electrode 26 adjacent the first monopolar electrode 18, a second bipolar electrode 28 adjacent the second monopolar electrode 20, and one intermediate bipolar electrode 30 disposed between the first and second bipolar electrodes 26, 28 for a total of three bipolar electrodes 26, 28, 30. As such, the bipolar battery 10 also includes a total of four non-liquid electrolyte layers 24.

The non-liquid electrolyte layers 24 each may comprise particles of a solid, gel, or polymeric ionically conductive lithium-containing electrolyte material. For example, each of the non-liquid electrolyte layers 24 may comprise one or more solid ionically conductive lithium-containing metal oxides and/or sulfides, which may comprise crystalline inorganic oxides and/or sulfides (e.g., LISICON-type, thio-LISICON-type, garnet-type, perovskite-type, and/or NASICON-type lithium ion conductive electrolytes) and/or glass-based inorganic oxides and/or sulfides (including glassy and glass-ceramic lithium ion conductive electrolytes). Examples of solid ionically conductive lithium-containing metal oxides include: garnet-type lithium lanthanum zirconium oxides, e.g., $Li_7La_3Zr_2O_{12}$ and/or $Li_{5+x}La_3M_{2-x}Zr_xO_{12}$, where M is Nb and/or Ta, and x is $0 \leq x \leq 2$ (e.g., $Li_5La_3Nb_2O_{12}$ and/or $Li_5La_3Ta_2O_{12}$), Li superionic conductors (LISICON-type), e.g., $Li_{14}Zn(GeO_4)_4$ and/or $Li_{3+x}(P_{1-x}Si_x)O_4$, Na superionic conductors (NASICON-type), e.g., $Li_{14+x}Al_xGe_{2-x}(PO_4)_3$, $Li_{1+x}Ti_{2-x}Al_x(PO_4)_3$, and/or $LiTi_{0.5}Zr_{1.5}(PO_4)_3$, perovskite-type lithium lanthanum titanates, e.g., $Li_{3.3}La_{0.56}TiO_3$, $Li_{3x}La_{2/3-x}TiO_3$, $Li_{0.5}M_{0.5}TiO_3$, wherein M is Sm, Nd, Pr, and/or La, antiperovskite-type lithium oxides, e.g., $Li_3OCl$ and/or $Li_3OBr$. Examples of solid ionically conductive lithium-containing metal sulfides include: lithium argyrodite-type (e.g., $Li_7P_2S_8I$ and/or $Li_6PS_5X$, wherein X is Cl, Br, and/or I), thio-LISICON-type (e.g., $Li_{10}GeP_2S_{12}$, $Li_{10.35}Ge_{1.35}P_{1.65}S_{12}$, $Li_{3.25}Ge_{0.25}P_{0.75}S_4$, $Li_{10}SnP_2S_{12}$, $Li_{10}SiP_2S_{12}$, $Li_{9.54}Si_{1.74}P_{1.44}S_{11.7}Cl_{0.3}$), and/or glass or glass-ceramic type ($70Li_2S.30P_2S_5$, $70Li_2S.29P_2S_5.P_2S_3$, $70Li_2S.29P_2S_5.Li_3PO_4$, $75Li_2S.24P_2S_5.P_2O_5$, $Li_{3.25}P_{0.95}S_4$, $Li_{9.6}P_3S_{12}$, $Li_7P_3S_{11}$, $70Li_2S.30P_2S_5$, $80Li_2S.20P_2S_5$, and/or $75Li_2S.25P_2S_5$). As another example, each of the non-liquid electrolyte layers 24 may comprise one or more solid or gel polymer electrolyte material. Such solid or gel polymer electrolyte materials may be polyether-based (e.g., poly (ethylene oxide) and/or poly(ethylene glycol)), polyester-based (e.g., polyethylene carbonate, poly(trimethylene carbonate), and/or poly(propylene carbonate)), nitrile-based (e.g., succinonitrile and/or poly(acrylonitrile)), and/or polysiloxane-based.

The non-liquid electrolyte material particles may have a mean particle diameter in the range of one nanometer to 1,000 nanometers (one micrometer). For example, the electrolyte material particles may have a mean particle diameter of greater than or equal to 1 nm and less than or equal to 750 nm, 500 nm, 250 nm, 100 nm, 75 nm, 50 nm, or 25 nm.

The first monopolar electrode 18 comprises a first terminal current collector 32 coated with an electrochemically active material layer 34, and the second monopolar electrode 20 comprises a second terminal current collector 36 coated with an electrochemically active material layer 38. In FIG. 1, the electrochemically active material layer 34 coated on the first terminal current collector 32 comprises a lithium ion battery positive electrode material and the electrochemically active material layer 38 coated on the second terminal current collector 36 comprises a lithium ion battery negative electrode material. For brevity, lithium ion battery positive electrode material and lithium ion battery negative electrode material respectively may be referred to as a positive electrode material or cathode material and a negative electrode material or anode material.

The first bipolar electrode 26 comprises a first bipolar current collector 40 respectively coated on opposite first and second sides with first and second electrochemically active material layers 42, 44, and the second bipolar electrode 28 comprises a second bipolar current collector 46 respectively coated on opposite first and second sides with first and second electrochemically active material layers 48, 50. In FIG. 1, the electrochemically active material layer 42 on the first side of the first bipolar current collector 40 comprises a negative electrode material and the electrochemically active material layer 44 on the second side of the first bipolar current collector 40 comprises a positive electrode material. At the same time, the electrochemically active material layer 48 on the first side of the second bipolar current collector 46 comprises a negative electrode material and the electrochemically active material layer 50 on the second side of the second bipolar current collector 46 comprises a positive electrode material.

In FIG. 1, the layer 34 of positive electrode material coated on the first terminal current collector 32 opposes the layer 42 of negative electrode material coated on the first side of the first bipolar current collector 40 with one of the non-liquid electrolyte layers 24 sandwiched therebetween to allow for lithium ion transport between the layers 34, 42. The layers 34, 24, 42 together define an electrochemical cell 16 of the bipolar battery 10. At the same time, the layer 38 of negative electrode material coated on the second terminal current collector 36 opposes the layer 50 of positive electrode material coated on the second side of the second bipolar current collector 46 with one of the non-liquid electrolyte layers 24 sandwiched therebetween to allow for lithium ion transport between the layers 38, 50. The layers 38, 24, 50 together define another electrochemical cell 16 of the bipolar battery 10.

The one or more intermediate bipolar electrodes 30 disposed between the first and second bipolar electrodes 26, 28 each comprise a bipolar current collector 52 respectively coated on opposite first and second sides with first and second electroactive material layers 54, 56. The first and second electroactive material layers 54, 56 each comprise at least one of: (i) a positive electrode material, (ii) a negative electrode material, or (iii) a capacitor electrode material. In FIG. 1, the first electroactive material layer 54 on the first side of the bipolar current collector 52 comprises a capacitor electrode material and the second electroactive material layer 56 on the second side of the bipolar current collector 52 comprises a positive electrode material.

In FIG. 1, the layer 44 of positive electrode material coated on the second side of the first bipolar current collector 40 opposes the layer 54 of capacitor electrode material coated on the first side of the bipolar current collector 52 with one of the non-liquid electrolyte layers 24 sandwiched therebetween to allow for lithium ion transport between the layers 44, 54. The layers 44, 24, 54 together define an electrochemical cell 16 of the bipolar battery 10. At the same time, the layer 56 of positive electrode material coated on the second side of the bipolar current collector 52 opposes the layer 48 of negative electrode material coated on the first side of the second bipolar current collector 46 with one of the non-liquid electrolyte layers 24 sandwiched therebetween to allow for lithium ion transport between the layers 56, 48. The layers 56, 24, 48 together define another electrochemical cell 16 of the bipolar battery 10.

The electrochemically active material layers 34, 42, 44, 48, 50 each comprise particles of a lithium ion battery positive electrode material or particles of a lithium ion battery negative electrode material. Chemical energy can be stored in the bulk crystalline and/or amorphous structure of the positive and negative electrode material particles of the bipolar battery 10. The first and second electroactive material layers 54, 56 each comprise particles of (i) a lithium ion battery positive electrode material, (ii) a lithium ion battery negative electrode material, and/or (iii) a capacitor electrode material. Chemical and/or electrical energy can be stored on the surface of positively or negatively charged capacitor electrode material particles in the bipolar battery 10.

In one form, each of the electrochemically active material layers 34, 42, 44, 48, 50 may have a thickness in the range of 10 micrometers to 1000 micrometers. In addition, each of the electroactive material layers 54, 56 may have a thickness in the range of 10 micrometers to 1000 micrometers. In some embodiments, the thickness of any layer 54, 56 that comprises capacitor electrode material particles may be greater than the thickness of a layer 34, 42, 44, 48, 50 that does not comprise capacitor electrode material particles. The thickness of each of the layers 34, 42, 44, 48, 50, 54, 56 may be selected so that each of the layers 34, 42, 44, 48, 50, 54, 56 exhibits the same overall capacitance (F).

The lithium ion battery positive electrode material particles may comprise any material that can store (insertion) and release (extraction) lithium ions via reversible electrochemical intercalation reactions. As such, the positive electrode material may be generally described as an intercalation host material. The reversible electrochemical intercalation reactions that occur during the insertion and extraction of lithium ions the bulk of from the positive electrode material may comprise electrochemical oxidation-reduction (redox) reactions. During discharge, the positive electrode material may accept electrons (and lithium ions) as a result of an electrochemical reduction reaction and, during charging, may release electrons (and lithium ions) as a result of an electrochemical oxidation reaction. The positive electrode material may comprise a lithium-based intercalation host material having a higher electrochemical intercalation potential than the intercalation host material of the negative electrode material. For example, the intercalation host material of the positive electrode material may comprise a layered oxide represented by the formula $LiMeO_2$, an olivine-type oxide represented by the formula $LiMePO_4$, a spinel-type oxide represented by the formula $LiMe_2O_4$, or a silicate represented by the formula $LiMeSiO_4$, where Me is a transition metal. Some examples of transition metals for the metal (Me) of the intercalation host material of the positive electrode material include Co, Ni, Mn, Fe, P, Al, V, and combinations thereof. In some specific embodiments, the lithium-based intercalation host material may comprise a layered lithium transition metal oxide, such as lithium cobalt oxide ($LiCoO_2$) and/or lithium-nickel-magnesium-cobalt oxide [$Li(Ni_xMn_yCo_z)O_2$], a spinel lithium transition metal oxide, such as spinel lithium manganese oxide ($LiMn_2O_4$), lithium iron phosphate ($LiFePO_4$), lithium fluorophosphate ($Li_2FePO_4F$), lithium nickel oxide ($LiNiO_2$), lithium aluminum manganese oxide ($Li_xAl_yMn_{1-y}O_2$), and/or lithium vanadium oxide ($LiV_2O_5$), or a lithium transition metal silicate, such as $LiFeSiO_4$ and/or $LiMnSiO_4$.

The lithium ion battery negative electrode material particles may comprise any material that can store (insertion) and release (extraction) lithium ions via reversible electrochemical intercalation reactions. The reversible electrochemical intercalation and deintercalation reactions that occur during the insertion and extraction of lithium ions from the bulk of the negative electrode material may comprise electrochemical oxidation-reduction (redox) reactions. During discharge, the negative electrode material may release electrons (and lithium ions) as a result of an electrochemical oxidation reaction and, during charging, may accept electrons (and lithium ions) as a result of an electrochemical reduction reaction. The lithium ion battery negative electrode material may have a lower electrochemical intercalation potential than the positive electrode material such that an electrochemical potential difference exists between the electrochemically and/or electroactive material layers of each electrochemical cell 16 in the bipolar battery 10. Some examples of intercalation host materials for the negative electrode material include graphite, silicon, silicon-based materials (e.g., silicon oxide and/or lithium-silicon alloys), tin, tin-based materials (e.g., tin oxide), titanium-based materials (e.g., titanium oxide and/or lithium titanate), and niobium-based materials (e.g., niobium oxide).

The positive and/or negative electrode material particles may have a mean particle diameter in the range of one nanometer (nm) to 30 micrometers (μm). For example, the positive and/or negative electrode material particles may have a mean particle diameter of greater than or equal to 1 nm and less than or equal to 25 μm, 15 μm, 5 μm, or 1 μm. The specific surface area of the positive and/or negative electrode material particles may be in the range of 0.1 $m^2/g$ to 300 $m^2/g$.

The electroactive capacitor electrode material particles may comprise a carbon-based electric double-layer capacitor (EDLC) material, sometimes referred to as a supercapacitor material, or a pseudocapacitor material. EDLC materials store electrical energy by the reversable physical adsorption and desorption of ions on the surface of positively or negatively charged particles of capacitor electrode material, a phenomenon known as static double layer capacitance. Positively charged capacitor electrode particles store and release negatively charged ions (anions) and negatively charged capacitor electrode particles store and release positively charged ions (cations). Pseudocapacitor materials store charge by the physical adsorption and desorption of ions on the surface capacitor electrode material particles and also by electric charge transfer between adsorbed ions and the capacitor electrode material particles, a phenomenon known as pseudocapacitance. In comparison to lithium ion battery positive and negative electrode materials in which lithium ion intercalation reactions and thus lithium ion storage can occur throughout the entire volume of the materials, the amount of charge (e.g., the amount of lithium ions) that can be stored by a capacitor electrode material is limited by the surface area of the capacitor electrode material particles. Therefore, the specific/volumetric energy density (amount of stored charge) of a lithium ion battery positive or negative electrode material is usually greater than that of a like amount of capacitor electrode material. However, because the physical adsorption and desorption of ions on the capacitor electrode material particles can occur much faster than the lithium ion intercalation reactions in the positive and negative electrode materials, capacitor electrode materials usually exhibit relatively high power density and thus can deliver a greater amount of charge in a short period of time than lithium ion battery positive and negative electrode materials.

Examples of EDLC materials include activated carbon, carbon xerogel, carbon aerogel, carbon nanotube, mesoporous carbon, templated carbon, carbide-derived carbon, graphene, porous carbon spheres, and/or heteroatom-doped carbon. Examples of pseudocapacitor materials include noble metal oxides, noble metal hydroxides, transition metal oxides, transition metal hydroxides, and/or electrically conductive polymers. Examples of noble metal oxides and hydroxides include oxides and/or hydroxides of ruthenium (Ru), rhodium (Rh), iridium (Ir), platinum (Pt), palladium (Pd), osmium (Os), gold (Au), and/or rhenium (Re). Examples of transition metal oxides and hydroxides include oxides and/or hydroxides of manganese (Mn), nickel (Ni), cobalt (Co), lead (Pb), copper (Cu), and/or iron (Fe). Specific examples of metal oxides and/or hydroxides include ruthenium oxide ($RuO_2$), manganese oxide ($MnO_2$), nickel oxide (NiO), cobalt oxide ($CO_3O_4$), cobalt hydroxide (Co$(OH)_2$), and nickel hydroxide (Ni$(OH)_2$). Examples of electrically conductive polymers include polyacrylonitrile, polypyrrole, polythiophene, poly(3-methyl thiophene), polyaniline, poly(paraphenylene), polyacene, and/or polyacetylene.

The capacitor electrode material particles may have a mean particle diameter in the range of one nanometer to 20 micrometers. For example, the capacitor electrode material particles may have a mean particle diameter of greater than or equal to 1 nm and less than or equal to 15 μm, 5 μm, or 1 μm. In one form, the specific surface area of the capacitor electrode material particles may be in the range of 50 $m^2/g$ to 2500 $m^2/g$.

In the layers 34, 42, 44, 48, 50, 54, 56, the positive, negative, and capacitor electrode material particles may be mixed or intermingled particles of the non-liquid electrolyte material. In such case, the electrode material particles may comprise greater than 30 wt. % of the layers 34, 42, 44, 48, 50, 54, 56 and the electrolyte material particles may comprise less than 60 wt. % of the layers 34, 42, 44, 48, 50, 54, 56.

In one form, the positive, negative, and/or capacitor electrode material particles also may be mixed or intermingled with a polymeric binder to provide the layers 34, 42, 44, 48, 50, 54, 56 with structural integrity and/or to adhere the layers 34, 42, 44, 48, 50, 54, 56 to the current collectors 32, 36, 40, 46, 52. Some examples of polymeric binders include polyvinylidene fluoride (PVdF), ethylene propylene diene monomer (EPDM) rubber, styrene butadiene rubber (SBR), carboxymethoxy cellulose (CMC), polyacrylic acid, and mixtures thereof. In addition, the layers 34, 42, 44, 48, 50, 54, 56 optionally may comprise particles of an electrically conductive material, which may comprise very fine particles of, for example, high-surface area carbon black and/or acetylene black The current collectors 32, 36, 40, 46, 52 may comprise any metallic material capable of collecting and reversibly passing free electrons to and from their respective electrode layers 34, 42, 44, 48, 50, 54, 56. For example, the current collectors 32, 36, 40, 46, 52 may comprise thin and flexible metallic foils. In one form, the current collectors 32, 36, 40, 46, 52 may comprise copper or a copper alloy. In another form, the current collectors 32, 36, 40, 46, 52 may comprise aluminum or an aluminum alloy. Other types of metal foils or metallic materials, such as titanium, stainless steel and Cu/Al cladded foils, may be used. In one form, each of the current collectors 32, 36, 40, 46, 52 may have a thickness in the range of 3 micrometers to 25 micrometers.

In FIG. 1, the first and second terminal current collectors 32, 36 are electrically coupled to a load 72 via an external circuit 74. In practice, the electrodes 18, 20, 22 of the bipolar battery 10 and their intervening non-liquid electrolyte layers 24 may be assembled in the form of a stack or a would roll.

Figure 2:
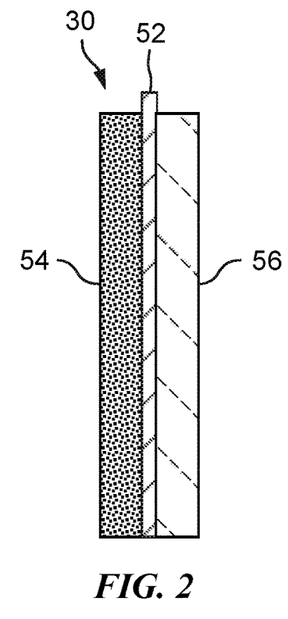
FIG. 2 is an enlarged view of one of the bipolar electrodes of FIG. 1 including a bipolar current collector having a layer of capacitor electrode material supported on a first side thereof and a layer of positive electrode material supported on an opposite second side thereof.
Figure 3:
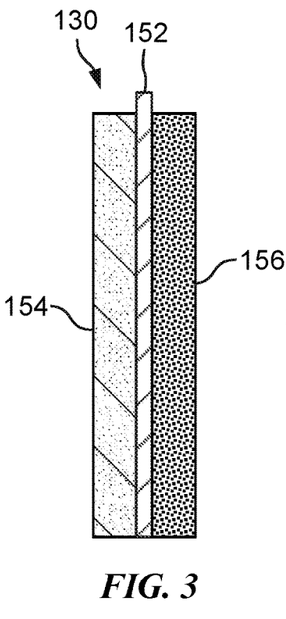
FIG. 3 is a schematic cross-sectional view of another bipolar electrode including a bipolar current collector having a layer of negative electrode material supported on a first side thereof and a layer of capacitor electrode material supported on an opposite second side thereof.
Figure 4:
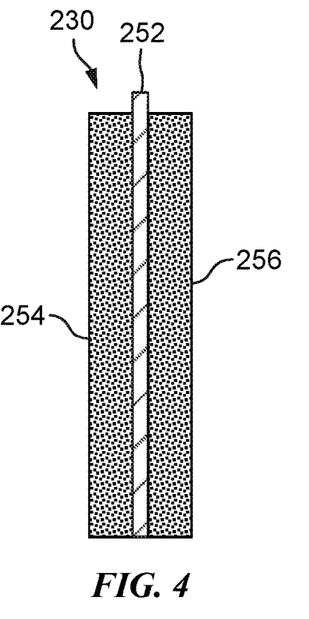
FIG. 4 is a schematic cross-sectional view of yet another bipolar electrode including a bipolar current collector having a layer of capacitor electrode material supported on a first side thereof and a layer of capacitor electrode material supported on an opposite second side thereof.

FIGS. 2-4, 6-8, and 10-12 depict various embodiments of intermediate bipolar electrodes that may be incorporated into lithium ion bipolar batteries to produce energy storage devices that exhibit different, useful combinations of energy density (Wh/kg) and power density (W/kg). As shown in FIG. 2, in one form, an intermediate bipolar electrode 30 disposed between a pair of first and second bipolar electrodes 26, 28 may comprise a bipolar current collector 52 having a layer 54 of capacitor material disposed on a first side thereof and a layer 56 of positive electrode material disposed on a second side thereof. In another form, as shown in FIG. 3, an intermediate bipolar electrode 130 of a lithium ion bipolar battery 10 may comprise a bipolar current collector 152 having a layer 154 of negative electrode material disposed on a first side thereof and a layer 156 of capacitor material disposed on a second side thereof. In yet another form, as shown in FIG. 4, an intermediate bipolar electrode 230 of a lithium ion bipolar battery 10 may comprise a bipolar current collector 252 having a layer 254 of capacitor material disposed on a first side thereof and a layer 256 of capacitor material disposed on a second side thereof.

Figures 6, 7:
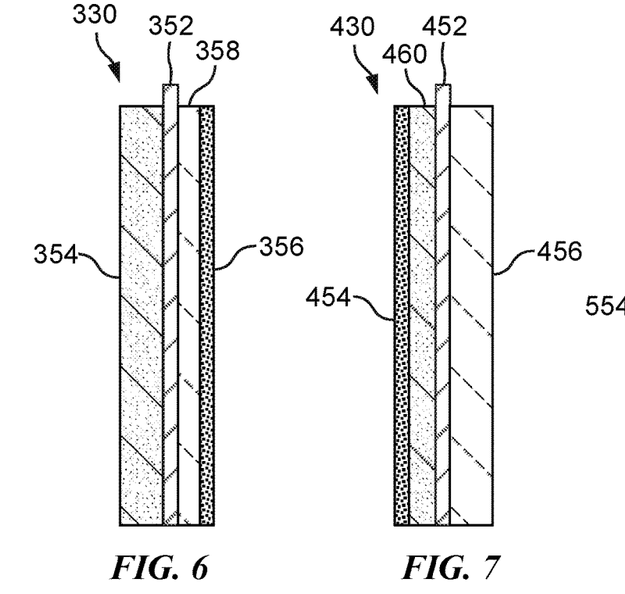
FIG. 6 is a schematic cross-sectional view of a bipolar electrode including a bipolar current collector having a layer of negative electrode material supported on a first side thereof and a layer of capacitor electrode material overlying a layer of positive electrode material on an opposite second side thereof.
FIG. 7 is a schematic cross-sectional view of a bipolar electrode including a bipolar current collector having a layer of capacitor electrode material overlying a layer of negative electrode material on a first side thereof and a layer of positive electrode material supported on an opposite second side thereof.
Figure 8:
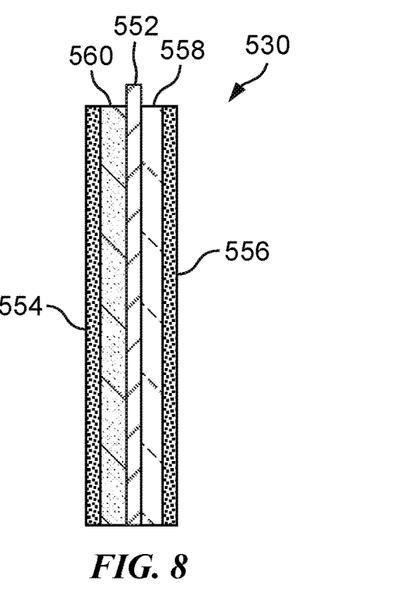
FIG. 8 is a schematic cross-sectional view of a bipolar electrode including a bipolar current collector having a layer of capacitor electrode material overlying a layer of negative electrode material on a first side thereof and a layer of capacitor electrode material overlying a layer of positive electrode material on an opposite second side thereof.

Referring now to FIG. 6, in one form, an intermediate bipolar electrode 330 of a lithium ion bipolar battery 10 may comprise a bipolar current collector 352 having a layer 354 of negative electrode material disposed on a first side thereof and a layer 356 of capacitor material overlying a layer 358 of positive electrode material on a second side thereof. In another form, as shown in FIG. 7, an intermediate bipolar electrode 430 of a lithium ion bipolar battery 10 may comprise a bipolar current collector 452 having a layer 454 of capacitor material overlying a layer 460 of negative electrode material on a first side thereof and a layer 456 of positive electrode material disposed on a second side thereof. In yet another form, as shown in FIG. 8, an intermediate bipolar electrode 530 of a lithium ion bipolar battery 10 may comprise a bipolar current collector 552 having a layer 554 of capacitor material overlying a layer 560 of negative electrode material on a first side thereof and a layer 556 of capacitor material overlying a layer 558 of positive electrode material on a second side thereof.

Figure 10:
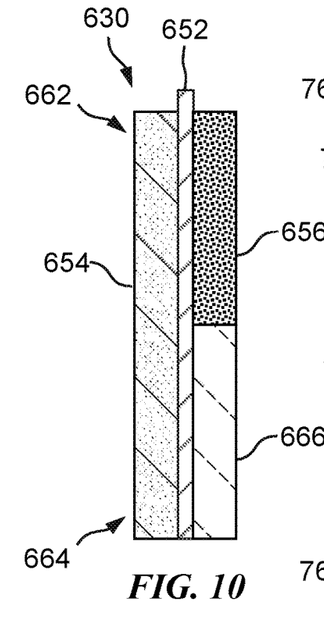
FIG. 10 is a schematic cross-sectional view of a bipolar electrode having an upper end and an opposite lower end and including a bipolar current collector having a layer of negative electrode material supported on a first side thereof and, on a second side thereof, a layer of capacitor material supported on the upper end thereof and a layer of positive electrode material supported on the lower end thereof.
Figure 11:
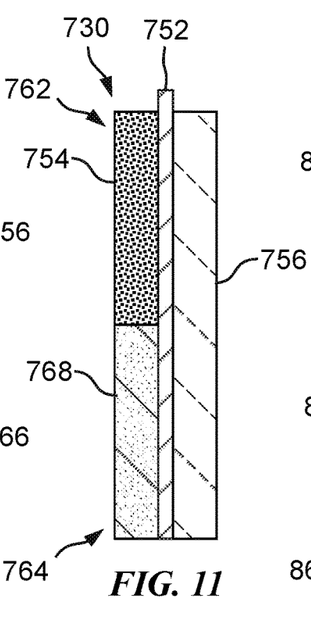
FIG. 11 is a schematic cross-sectional view of another bipolar electrode having an upper end and an opposite lower end and including a bipolar current collector having, on a first side thereof, a layer of capacitor material supported on the upper end thereof and a layer of negative electrode material supported on the lower end thereof, and, on a second side thereof, a layer of positive electrode material.
Figure 12:
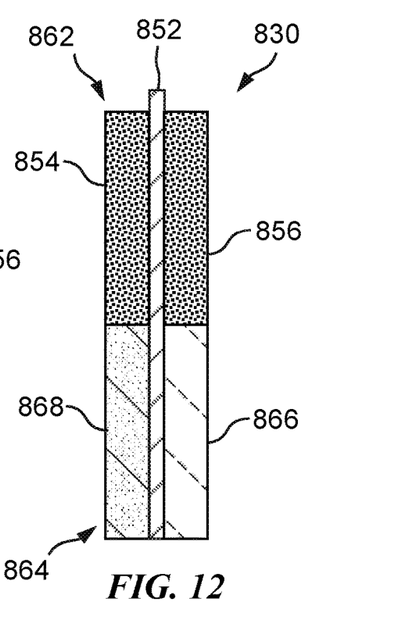
FIG. 12 is a schematic cross-sectional view of yet another bipolar electrode having an upper end and an opposite lower end and including a bipolar current collector having, on a first side thereof, a layer of capacitor material supported on the upper end thereof and a layer of negative electrode material supported on the lower end thereof, and, on a second side thereof, a layer of capacitor material supported on the upper end thereof and a layer of positive electrode material supported on the lower end 864 thereof.

Referring now to FIGS. 10, 11, and 12, each of the intermediate bipolar electrodes 630, 730, 830 comprises an upper end 662, 762, 862 and an opposite lower end 664, 764, 864. In such case, as shown in FIG. 10, in one form, an intermediate bipolar electrode 630 of a lithium ion bipolar battery 10 may comprise a bipolar current collector 652 having a layer 654 of negative electrode material disposed on a first side thereof and, on a second side thereof, a layer 656 of capacitor material may be coated on the upper end 762 thereof and a layer 666 of positive electrode material may be coated on the lower end 664 thereof. In another form, as shown in FIG. 11, an intermediate bipolar electrode 730 of a lithium ion bipolar battery 10 may comprise a bipolar current collector 752 having, on a first side thereof, a layer 754 of capacitor material coated on the upper end 762 thereof and a layer of negative electrode material 768 on the lower end 764 thereof, and, on a second side thereof, a layer 756 of positive electrode material. In yet another form, as shown in FIG. 12, an intermediate bipolar electrode 830 of a lithium ion bipolar battery 10 may comprise a bipolar current collector 852 having, on a first side thereof, a layer 854 of capacitor material coated on the upper end 862 thereof and a layer of negative electrode material 868 coated on the lower end 864 thereof, and, on a second side thereof, a layer 856 of capacitor material may be coated on the upper end 862 thereof and a layer 866 of positive electrode material may be coated on the lower end 864 thereof.

One or more of the intermediate bipolar electrodes 30, 130, 230, 330, 430, 530, 630, 730, 830 may be incorporated into a lithium ion bipolar battery 10 to produce an energy storage device that exhibits a desired combination of energy density (Wh/kg) and power density (W/kg).

Figure 5:
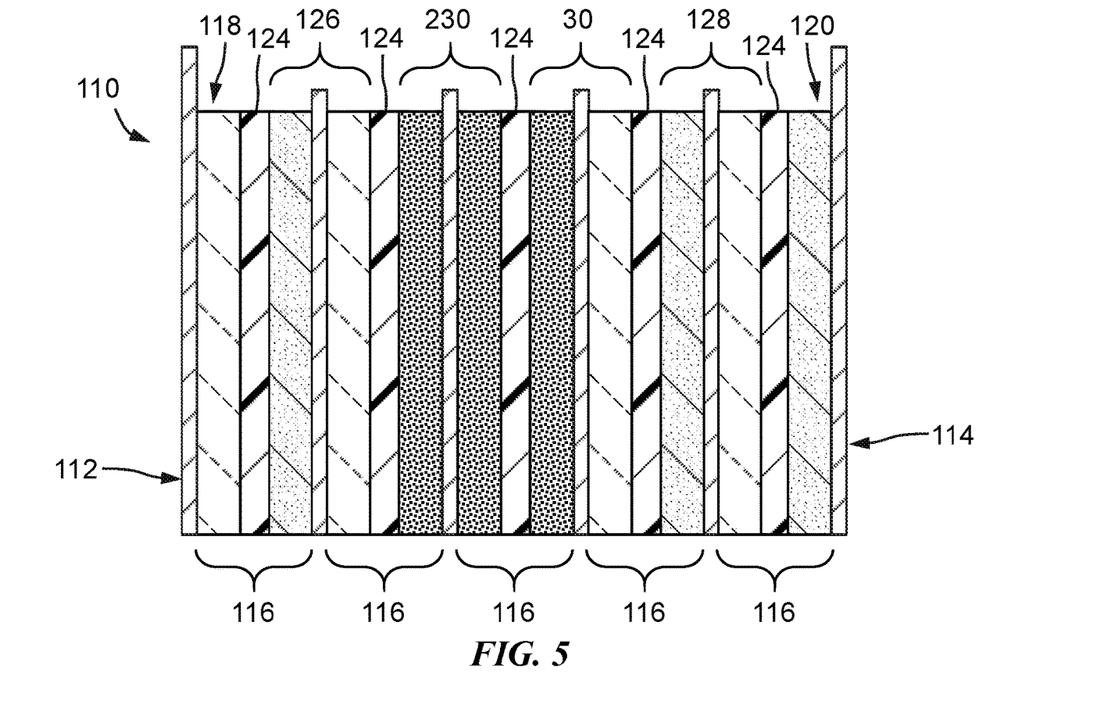
FIG. 5 is a schematic cross-sectional view of another bipolar battery comprising multiple bipolar electrodes disposed between a pair of monopolar electrodes and including the bipolar electrode of FIG. 2 and the bipolar electrode of FIG. 4.

Referring now to FIG. 5, in another form, a lithium ion bipolar battery 110 may comprise a first end 112, an opposite second end 114, and multiple serially-arranged electrochemical cells 116 disposed in face-to-face relationship between the first and second ends 112, 114 thereof. The bipolar battery 110 depicted in FIG. 5 is similar in many respects to the bipolar battery 10 shown and described above with respect to FIG. 1 and like numerals between the embodiments generally designate like or corresponding elements throughout the several views of the drawing figures. Description of common subject matter between the embodiments and like or corresponding elements thereof generally may not be repeated here.

The electrochemical cells 116 of the battery 110 are defined by a first monopolar electrode 118 disposed at the first end 112 of the battery 110, a second monopolar electrode 120 disposed at the second end 114 of the battery 110, a first bipolar electrode 126 adjacent the first monopolar electrode 118, a second bipolar electrode 128 adjacent the second monopolar electrode 120, two intermediate bipolar electrodes 230, 30 disposed between the first and second bipolar electrodes 126, 128, and five intervening non-liquid electrolyte layers 124 disposed between the adjacent electrodes 118, 120, 122, 126, 128, 230, 30. The first and second monopolar electrodes 118, 120, the first and second bipolar electrodes 126, 128, and the non-liquid electrolyte layers 124 may have the same structure and chemical composition as the first and second monopolar electrodes 18, 20, the first and second bipolar electrodes 26, 28, and the non-liquid electrolyte layers 24 shown in FIG. 1. The intermediate bipolar electrodes 30, 230 shown in FIG. 5 may have the same structure and chemical composition as the bipolar electrodes 30, 230 respectively shown in FIGS. 2 and 4.

Figure 9:
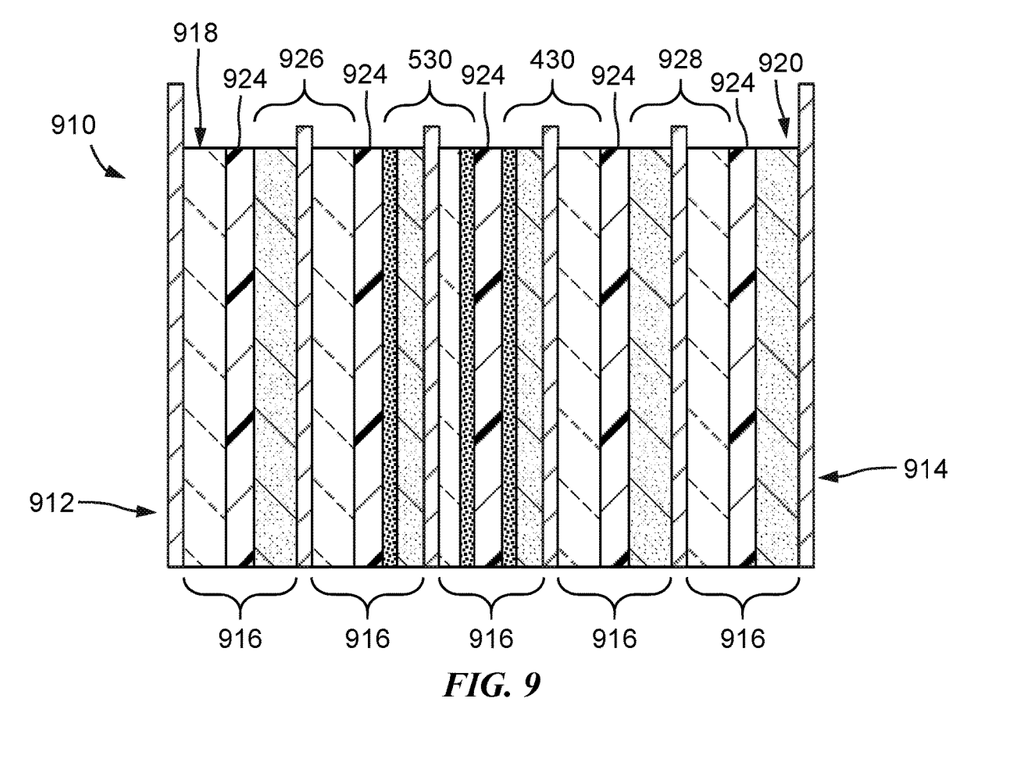
FIG. 9 is a schematic cross-sectional view of yet another bipolar battery comprising multiple bipolar electrodes disposed between a pair of monopolar electrodes and including the bipolar electrode of FIG. 7 and the bipolar electrode of FIG. 8.

Referring now to FIG. 9, in another form, a lithium ion bipolar battery 910 may comprise a first end 912, an opposite second end 914, and multiple serially-arranged electrochemical cells 916 disposed in face-to-face relationship between the first and second ends 912, 914 thereof. The bipolar battery 910 depicted in FIG. 9 is similar in many respects to the bipolar battery 10 shown and described above with respect to FIG. 1 and like numerals between the embodiments generally designate like or corresponding elements throughout the several views of the drawing figures. Description of common subject matter between the embodiments and like or corresponding elements thereof generally may not be repeated here.

The electrochemical cells 916 of the battery 910 are defined by a first monopolar electrode 918 disposed at the first end 912 of the battery 910, a second monopolar electrode 920 disposed at the second end 914 of the battery 910, a first bipolar electrode 926 adjacent the first monopolar electrode 918, a second bipolar electrode 928 adjacent the second monopolar electrode 920, two intermediate bipolar electrodes 530, 430 disposed between the first and second bipolar electrodes 926, 928, and five intervening non-liquid electrolyte layers 924 disposed between the adjacent electrodes 918, 920, 922, 926, 928, 530, 430. The first and second monopolar electrodes 918, 920, the first and second bipolar electrodes 926, 928, and the non-liquid electrolyte layers 924 may have the same structure and chemical composition as the first and second monopolar electrodes 18, 20, the first and second bipolar electrodes 26, 28, and the non-liquid electrolyte layers 24 shown in FIG. 1. The intermediate bipolar electrodes 430, 530 shown in FIG. 9 may have the same structure and chemical composition as the bipolar electrodes 430, 530 respectively shown in FIGS. 7 and 8.

Figure 13:
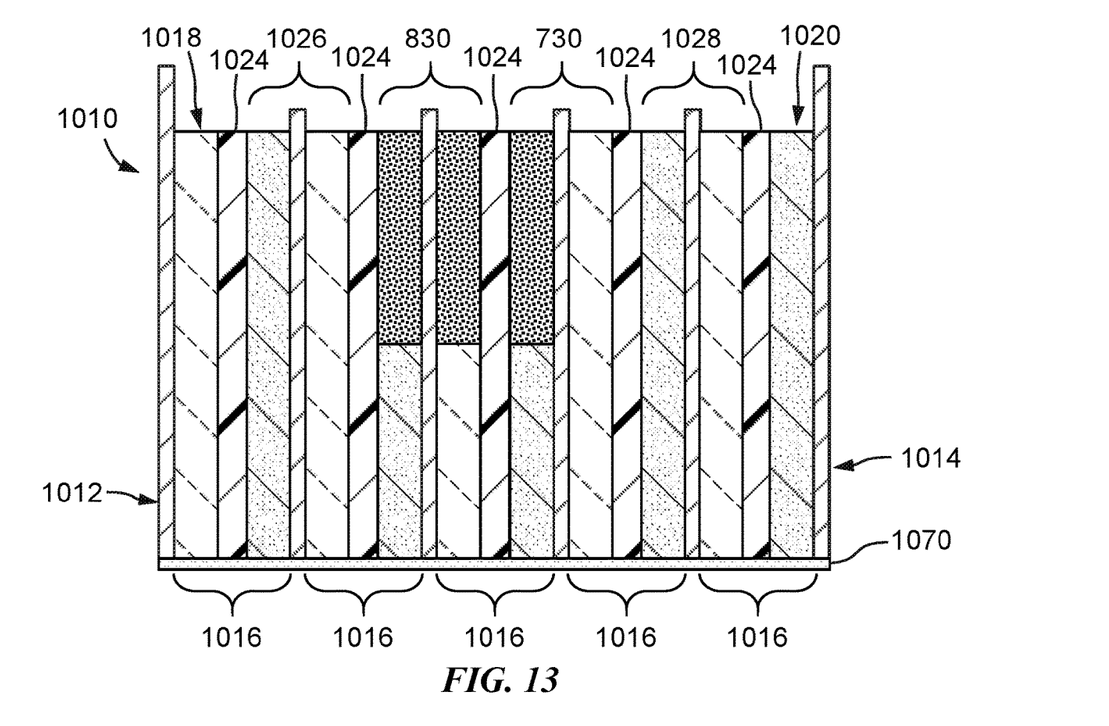
FIG. 13 is a schematic cross-sectional view of another bipolar battery comprising multiple bipolar electrodes disposed between a pair of monopolar electrodes and including the bipolar electrode of FIG. 11 and the bipolar electrode of FIG. 12.

Referring now to FIG. 13, in another form, a lithium ion bipolar battery 1010 may comprise a first end 1012, an opposite second end 1014, and multiple serially-arranged electrochemical cells 1016 disposed in face-to-face relationship between the first and second ends 1012, 1014 thereof. The bipolar battery 1010 depicted in FIG. 13 is similar in many respects to the bipolar battery 10 shown and described above with respect to FIG. 1 and like numerals between the embodiments generally designate like or corresponding elements throughout the several views of the drawing figures. Description of common subject matter between the embodiments and like or corresponding elements thereof generally may not be repeated here.

The electrochemical cells 1016 of the battery 1010 are defined by a first monopolar electrode 1018 disposed at the first end 1012 of the battery 1010, a second monopolar electrode 1020 disposed at the second end 1014 of the battery 1010, a first bipolar electrode 1026 adjacent the first monopolar electrode 1018, a second bipolar electrode 1028 adjacent the second monopolar electrode 1020, two intermediate bipolar electrodes 830, 730 disposed between the first and second bipolar electrodes 1026, 1028, and five intervening non-liquid electrolyte layers 1024 disposed between the adjacent electrodes 1018, 1020, 1022, 1026, 1028, 830, 730. The first and second monopolar electrodes 1018, 1020, the first and second bipolar electrodes 1026, 1028, and the non-liquid electrolyte layers 1024 may have the same structure and chemical composition as the first and second monopolar electrodes 18, 20, the first and second bipolar electrodes 26, 28, and the non-liquid electrolyte layers 24 shown in FIG. 1. The intermediate bipolar electrodes 730, 830 shown in FIG. 13 may have the same structure and chemical composition as the bipolar electrodes 730, 830 respectively shown in FIGS. 11 and 12.

In some embodiments, the location of the capacitor material particles in the bipolar batteries 10, 110, 910, 1010 may be tailored to account for regions of the batteries 10, 110, 910, 1010 that exhibit different operating characteristics. For example, in some embodiments, capacitor material particles (instead of battery electrode material particles) may be positioned in regions of the batteries 10, 110, 910, 1010 that exhibit relatively high current density and/or in regions of the batteries 10, 110, 910, 1010 that experience relatively high temperatures, as compared to other regions of the batteries 10, 110, 910, 1010. As shown in FIG. 13, in practice a cooling medium 1070 may be positioned adjacent the lower ends 764, 864 of the intermediate bipolar electrodes 730, 830. In such case, it may be desirable to position the capacitor material particles adjacent the upper ends 762, 862 as those regions of the battery 1010 may experience relatively high temperatures or "hot spots," as compared to the lower ends 764, 864 of the intermediate bipolar electrodes 730, 830.

The above description of preferred exemplary embodiments, aspects, and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A bipolar battery comprising:

first, second, and third bipolar electrodes positioned adjacent one another and being physically and electrically isolated from one another by only intervening non-liquid inorganic electrolyte layers, wherein the third bipolar electrode is disposed between the first bipolar electrode and the second bipolar electrode, each of the first and second bipolar electrodes comprising a bipolar current collector including a first electroactive material layer connected to a first side thereof and a second electroactive material layer connected to a second side thereof, wherein each of the first and second electroactive material layers comprises at least one of: (i) a first lithium ion battery positive electrode material, (ii) a first lithium ion battery negative electrode material, or (iii) a first capacitor electrode material, and wherein at least the first and second bipolar electrodes have at least one distinct electroactive material layer from one another, and wherein the third bipolar electrode comprises a second bipolar current collector including a third electroactive material layer connected to a first side thereof and a fourth electroactive material layer connected to a second side thereof, wherein each of the third and fourth electroactive material layers comprises at least one of: (i) second lithium ion battery positive electrode material, (ii) a second lithium ion battery negative electrode material, or (iii) a second capacitor electrode material, wherein at least one of (i) the second lithium ion battery positive electrode material and (ii) the second lithium ion battery negative electrode material is configured to reversibly intercalate lithium ions, wherein at least one of the third and fourth electroactive material layers comprises both (iii) the second capacitor electrode material and at least one of (i) the second lithium ion battery positive electrode material or (ii) the second lithium ion battery negative electrode material, and in a configuration where (iii) the second capacitor electrode material is adjacent to and in contact with one of the non-liquid inorganic electrolyte layers and the third electroactive material layer or the fourth electroactive material layer has either:

(i) the second lithium ion battery positive electrode material or (ii) the second lithium ion battery negative electrode material covering the third side or the fourth side of the second bipolar current collector and (iii) the second capacitor electrode material overlies the (i) the second lithium ion battery positive electrode material or (ii) the second lithium ion battery negative electrode material; or the third side or the fourth side defines an upper end and a lower end, wherein one of the upper end or the lower end comprises (iii) the second capacitor electrode material and the other of the upper end or lower end comprises (i) the second lithium ion battery positive electrode material or (ii) the second lithium ion battery negative electrode material.

2. The bipolar battery of claim 1 wherein at least one of the first and second capacitor electrode material comprises at least one electric double-layer capacitor material selected from the group consisting of activated carbon, carbon xerogel, carbon aerogel, carbon nanotube, mesoporous carbon, templated carbon, carbide-derived carbon, graphene, porous carbon spheres, or heteroatom-doped carbon.

3. The bipolar battery of claim 1 wherein at least one of the first and second capacitor electrode material comprises at least one pseudocapacitor material selected from the group consisting of a noble metal oxide, a noble metal hydroxide, a transition metal oxide, a transition metal hydroxide, or an electrically conductive polymer.

4. The bipolar battery of claim 1 wherein at least one of the first or second bipolar electrodes includes a lithium ion battery positive electrode material layer coated on the first side thereof and a lithium ion battery negative electrode material layer coated on the second side thereof.

5. A bipolar battery comprising:
a first bipolar electrode comprising a first bipolar current collector respectively coated on opposite first and second sides with a lithium ion battery negative electrode material layer and a lithium ion battery positive electrode material layer;
a second bipolar electrode spaced apart from the first bipolar electrode, the second bipolar electrode comprising a second bipolar current collector respectively coated on opposite first and second sides with a lithium ion battery negative electrode material layer and a lithium ion battery positive electrode material layer; and
one or more intermediate bipolar electrodes disposed between the first and second bipolar electrodes, the one or more intermediate bipolar electrodes each comprising a bipolar current collector coated on opposite first and second sides with electroactive material layers,
wherein the bipolar electrodes are physically separated and electrically isolated from one another by only a plurality of intervening non-liquid electrolyte layers comprising solid ionically conductive lithium-containing crystalline inorganic oxides and/or sulfides,
wherein each electroactive material layer of the one or more intermediate bipolar electrodes comprises at least one of: (i) a lithium ion battery positive electrode material, (ii) a lithium ion battery negative electrode material, or (iii) a capacitor electrode material,
wherein the lithium ion battery positive electrode material and the lithium ion battery negative electrode material are configured to reversibly intercalate lithium ions,
wherein a first side of at least one of the intermediate bipolar electrodes comprises the capacitor electrode material and (ii) the lithium ion battery negative electrode material and a second side comprises (i) the lithium ion battery positive electrode material,
wherein the first side has a configuration where:
(ii) the lithium ion battery negative electrode material covers the bipolar current collector and (iii) the capacitor electrode material overlies the (ii) the lithium ion battery negative electrode material; or
the first side defines an upper end and a lower end, wherein one of the upper end or the lower end comprises (iii) the capacitor electrode material and the other of the upper end or lower end comprises (ii) the lithium ion battery negative electrode material, and
wherein (iii) the capacitor electrode material on the first side is adjacent to and in contact with one of the non-liquid electrolyte layers.

6. The bipolar battery of claim 5 wherein the second side of the at least one of the intermediate bipolar electrodes further comprises a layer of a capacitor electrode material overlying a layer of (i) the lithium ion battery positive electrode material.

7. The bipolar battery of claim 5 wherein the second side of the at least one of the intermediate bipolar electrodes comprises an upper end and a lower end and further comprises (iii) the capacitor electrode material coated on the upper end and the (i) the lithium ion battery positive electrode material coated on the lower end thereof.

8. The bipolar battery of claim 7 comprising a cooling medium disposed adjacent the lower ends of the intermediate bipolar electrodes.

9. The bipolar battery of claim 5 wherein the total number of first, second, and intermediate bipolar electrodes=n, and wherein the total number of non-liquid electrolyte layers=n+1.

10. The bipolar battery of claim 5 comprising a first monopolar electrode disposed at a first end thereof and a second monopolar electrode disposed at an opposite second end thereof, wherein the first monopolar electrode comprises a first terminal current collector coated with a lithium ion battery negative electrode material layer, wherein the second monopolar electrode comprises a second terminal current collector coated with a lithium ion battery positive electrode material layer, and wherein the first, second, and intermediate bipolar electrodes are disposed between and electrically isolated from the first and second monopolar electrodes.

11. The bipolar battery of claim 10 wherein the lithium ion battery negative electrode material layer of the first monopolar terminal electrode is located opposed to and in electrochemically coupled relation to the lithium ion battery positive electrode material layer of the first bipolar electrode and the lithium ion battery positive electrode material layer of the second monopolar terminal electrode is located opposed to and in electrochemically coupled relation to the lithium ion battery negative electrode material layer of the second bipolar electrode.

12. A bipolar battery comprising:
a first monopolar electrode disposed at a first end thereof, the first monopolar electrode comprising a first terminal current collector coated with a lithium ion battery negative electrode material layer, the first terminal current collector being configured to be coupled to an external conduit;

a second monopolar electrode disposed at an opposite second end thereof, the second monopolar electrode comprising a second terminal current collector coated with a lithium ion battery positive electrode material layer, the second terminal current collector being configured to be coupled to an external conduit; and a first bipolar electrode comprising a first bipolar current collector respectively coated on opposite first and second sides with a lithium ion battery negative electrode material layer and a lithium ion battery positive electrode material layer;

a second bipolar electrode spaced apart from the first bipolar electrode, the second bipolar electrode comprising a second bipolar current collector respectively coated on opposite first and second sides with a lithium ion battery negative electrode material layer and a lithium ion battery positive electrode material layer; and two or more intermediate bipolar electrodes disposed between the first and second bipolar electrodes, the two or more intermediate bipolar electrodes each comprising a bipolar current collector coated on opposite first and second sides with electroactive material layers and the two or more intermediate bipolar electrodes each comprising at least one distinct electroactive material layer from one another, wherein the bipolar electrodes are physically separated and electrically isolated from one another by only a plurality of intervening non-liquid electrolyte layers comprising solid ionically conductive lithium-containing crystalline inorganic oxides and/or sulfides, wherein each electroactive material layer of the two or more intermediate bipolar electrodes comprises at least one of: (i) a lithium ion battery positive electrode material, (ii) a lithium ion battery negative electrode material, or (iii) a capacitor electrode material, wherein the lithium ion battery positive electrode material and the lithium ion battery negative electrode material are configured to reversibly intercalate lithium ions, wherein each of the intermediate bipolar electrodes comprises an upper end and an opposite lower end, and wherein the electroactive material layer coated on a first side of at least one of the intermediate bipolar electrodes comprises a capacitor material coated on the upper end thereof and a lithium ion battery negative electrode material coated on the lower end thereof and the electroactive material layer coated on a second side thereof comprises a capacitor electrode material coated on the upper end thereof and a lithium ion battery positive electrode material coated on the lower end thereof, wherein the capacitor material is in contact with at least one of the non-liquid electrolyte layers, and wherein a cooling medium is disposed adjacent to the lower ends of the intermediate bipolar electrodes.

* * * * *